United States Patent
Kawashima

(10) Patent No.: US 6,895,163 B2
(45) Date of Patent: May 17, 2005

(54) SPREAD ILLUMINATING APPARATUS WITH COVER PROVIDED OVER TRANSPARENT SUBSTRATE

(75) Inventor: Satoshi Kawashima, Iwata-gun (JP)

(73) Assignee: Minebea Co., Ltd., Kitasaku (JP)

( * ) Notice: Subject to any disclaimer, the term of this patent is extended or adjusted under 35 U.S.C. 154(b) by 365 days.

(21) Appl. No.: 10/059,219

(22) Filed: Jan. 31, 2002

(65) Prior Publication Data
US 2002/0106182 A1 Aug. 8, 2002

(30) Foreign Application Priority Data
Feb. 2, 2001 (JP) ..................................... 2001-027122

(51) Int. Cl.⁷ .......................................... G02B 385/146
(52) U.S. Cl. .......................... 385/146; 385/39; 385/25; 349/63; 349/173
(58) Field of Search ................................ 385/146, 129, 385/130, 131, 132, 141, 25, 144, 39, 142; 349/63, 104, 173

(56) References Cited

U.S. PATENT DOCUMENTS

| | | | | |
|---|---|---|---|---|
| 3,612,654 A | * | 10/1971 | Klein et al. ................ | 349/113 |
| 4,160,754 A | * | 7/1979 | Schapel et al. ............. | 523/102 |
| 4,770,641 A | * | 9/1988 | Rowlette ..................... | 439/86 |
| 4,856,869 A | * | 8/1989 | Sakata et al. ............... | 349/201 |
| 6,295,104 B1 | * | 9/2001 | Egawa et al. ................ | 349/63 |
| 6,323,923 B1 | * | 11/2001 | Hoshino et al. ............ | 349/113 |
| 6,456,279 B1 | * | 9/2002 | Kubo et al. ................. | 345/173 |
| 6,610,994 B1 | * | 8/2003 | Tanabe ................... | 250/559.45 |
| 2002/0101399 A1 | * | 8/2002 | Kubo et al. ................. | 345/104 |

FOREIGN PATENT DOCUMENTS

JP  A 2000-170761  6/2000 ........... F16C/29/00

* cited by examiner

Primary Examiner—K. Kianni
(74) Attorney, Agent, or Firm—Oliff & Berridge, PLC

(57) ABSTRACT

There is provided a spread illuminating apparatus to ensure excellent light conductivity. A cover is integrally provided over a transparent substrate sandwiching a fluid (cushioning material) of a gel, liquid, or gaseous substance. With this structure, dust generated in assembly process is prohibited from getting on the transparent substrate, and even when other members or an assembly machine hit and bend the cover during the assembly process, the bending is absorbed by the fluid, and a light reflection pattern formed on the transparent substrate is protected against damages, whereby excellent light conductivity can be maintained.

7 Claims, 4 Drawing Sheets

SPREAD ILLUMINATING APPARATUS WITH COVER PROVIDED OVER TRANSPARENT SUBSTRATE

This application, Under Title 35, U.S. Code j119, claims the priority benefit of Japanese Patent Application No. 2001-27122 filed on Feb. 2, 2001.

BACKGROUND OF THE INVENTION

1. Field of the Invention

The present invention relates to a spread illuminating apparatus used as an illuminating means for signboards, various kinds of reflection-type display devices, and more particularly for a liquid crystal display device.

2. Description of the Related Art

A liquid crystal display device operated with small power consumption is characterized by low profile and light weight, and the demand mainly for display devices in cellular phones and personal computers has been increased. Since a liquid crystal, which is a component of the liquid crystal display device, does not emit light by itself unlike a light emitting element such as a cathode-ray tube, an illuminating means is required for viewing an image. In particular, in the recent demand for lower profile, there is a growing tendency to employ a thin plate-like spread illuminating apparatus of side light type (light conductive plate type) as an illuminating means for the liquid crystal display device.

An example of such a side light type spread illuminating apparatus is disclosed in Japanese Patent Application No. 2000-170761 by the applicant of the present invention.

As shown in FIG. 6, this spread illuminating apparatus 1 is generally composed of a transparent substrate (guide plate) 2 made of a light-transmissible material and a bar-like light source 3 disposed close to an end surface 2a of the transparent substrate 2. Light rays emitted from the light source 3 are introduced into the transparent substrate 2 and irradiate a liquid crystal display device (not shown) disposed under the transparent substrate 2, whereby the spread illuminating apparatus illuminates auxiliarily the liquid crystal display device.

The light source 3 is generally composed of a light conductive member (guide rod) 4 made of a transparent material, formed in a rod-shape and disposed close to and along the end surface 2a of the transparent substrate 2, and spot-like light sources 5 and 6, for example LEDs, disposed on one end 4a and the other end 4b of the light conductive member 4, respectively.

An optical path conversion means 7 is provided on a surface 4d of the light conductive member 4 opposite to a surface 4c facing the transparent substrate 2. The optical path conversion means 7 comprises a large number of grooves 7a shaped substantially triangular in section and arrayed in the longitudinal direction, and is adapted to uniformly spread light rays emitted from the spot-like light sources 5 and 6 to the surface 4c of the light conductive member 4.

A light reflection pattern 8 composed of a large number of grooves 8a shaped triangular in section and a large number of flat portions 8b each present between adjacent grooves 8a is formed on one surface (an upper side in FIG. 6, hereinafter referred to as "upper surface" 2c) of the transparent substrate 2. The large number of grooves 8a each extend running parallel to the light conductive member 4, and are arrayed from the end surface 2a to an end surface 2b opposite to the end surface 2a. The ratio of the width of the grooves 8a to the width of the flat portions 8b gradually increases in proportion to the increase in distance from the light conductive member 4, whereby light rays coming in from the light conductive member 4 are reflected almost uniformly everywhere at the transparent substrate 2 irrespective of the distance from the light conductive member 4, and irradiate the liquid crystal display device (not shown) disposed under the transparent substrate 2.

In the above-described spread illuminating apparatus 1, since the transparent substrate 2 does not have its upper surface 2c covered by anything when combined with other members, the upper surface 2c can be damaged and broken pieces of the transparent substrate 2 or other refuse can get in the grooves 8a of the light reflection pattern 8 in assembly process or during use, whereby the light conductivity of the transparent substrate 2 may be degraded.

To solve the above-described problem, the applicant of the present invention proposed a spread illuminating apparatus in Japanese Patent Application No. 2000-170761 in which a film is provided close to an upper surface of a transparent substrate so as to cover a light reflection pattern formed on the transparent substrate.

In this spread illuminating apparatus, the film prevents the refuse from getting on the light reflection pattern during the assembly process, thereby protecting the surface of the transparent substrate against damages. However, the film is easily brought into direct contact with the transparent substrate, which can damage the light reflection pattern, and as a result the light conductivity may be degraded.

SUMMARY OF THE INVENTION

The present invention has been made in the light of the above problem, and it is an object of the present invention to provide a spread illuminating apparatus to ensure excellent light conductivity.

According to a first aspect of the present invention, in a spread illuminating apparatus comprising: a transparent substrate made of a light-transmissible material and having a light reflection pattern formed on at least one surface; and a bar-like light source disposed close to one end surface of the transparent substrate; a cover formed of a light-transmissible material is integrally provided over one surface of the transparent substrate sandwiching a cushioning material made of a light-transmissible substance.

According to a second aspect of the present invention, in the spread illuminating apparatus of the first aspect of the present invention, the cushioning material is of a substance with low refractive index.

According to a third or fourth aspect of the present invention, in the spread illuminating apparatus of the second aspect of the present invention, the substance is gel or liquid.

According to a fifth aspect of the present invention, in the spread illuminating apparatus of the first aspect of the present invention, the cushioning material is of a gaseous substance.

According to a sixth to eighth aspect of the present invention, in the spread illuminating apparatus of the first aspect of the present invention, a thin film of a substance with low refractive index is formed on the light reflection pattern of the transparent substrate, and the cushioning material is of a gel, liquid, or gaseous substance.

According to a ninth aspect of the present invention, in the spread illuminating apparatus of the first aspect of the present invention, the cushioning material comprises a plurality of transparent elastic members.

According to a tenth aspect of the present invention, in the spread illuminating apparatus of the first aspect of the present invention, the cover is made of a hard material.

According to an eleventh or twelfth aspect of the present invention, in the spread illuminating apparatus of the tenth aspect of the present invention, the hard material is glass or transparent polymer.

According to a thirteenth aspect of the present invention, in the spread illuminating apparatus of the first aspect of the present invention, the cover constitutes a lower electrode substrate of a touch panel which may be used in combination with the spread illuminating apparatus and disposed thereover.

DESCRIPTION OF THE PREFERRED EMBODIMENTS

Figure 6:
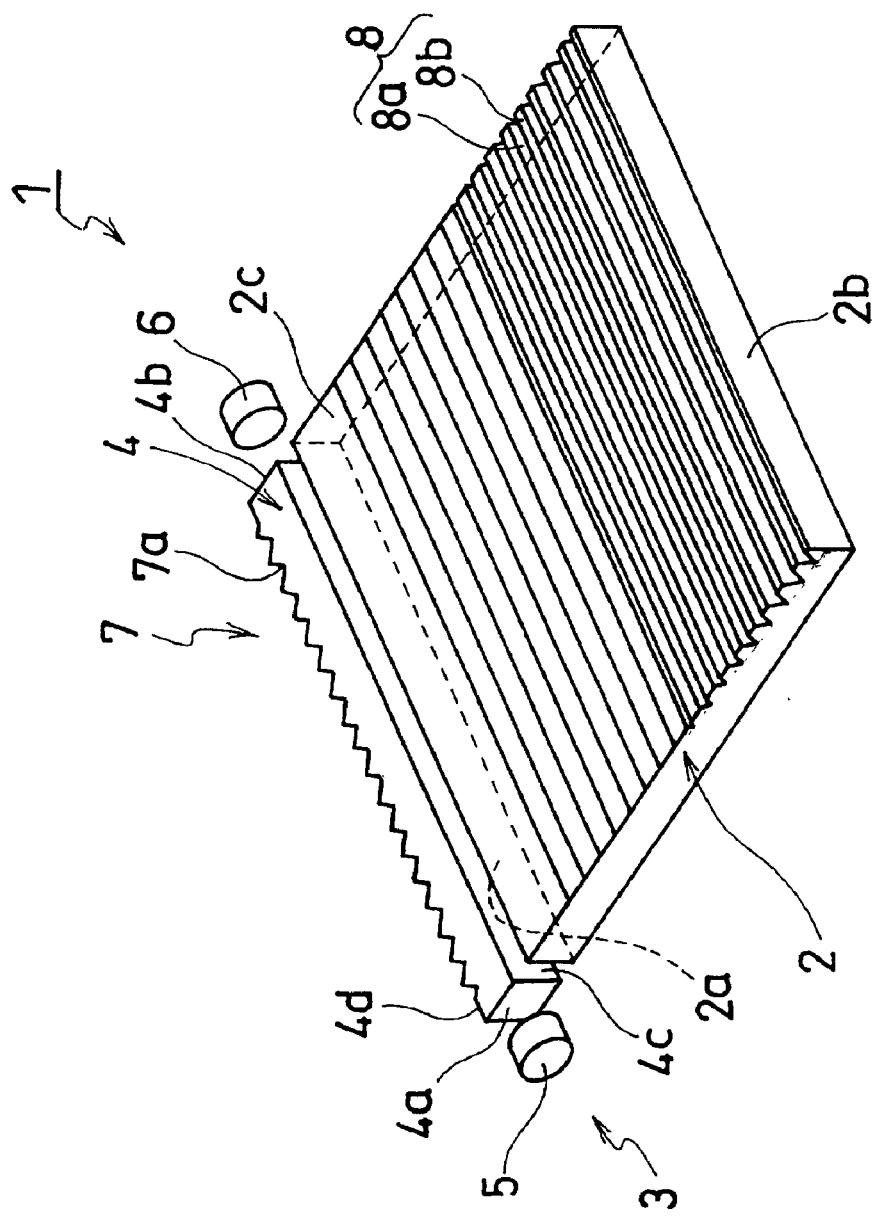
FIG. 6 is an exploded perspective view of an example of a conventional spread illuminating apparatus.

A spread illuminating apparatus 1A according to a first embodiment of the present invention will be described with reference to FIGS. 1 and 2. The components identical with and corresponding to those in FIG. 6 are represented by the same reference numerals, and detailed description thereof is omitted.

Figure 1:
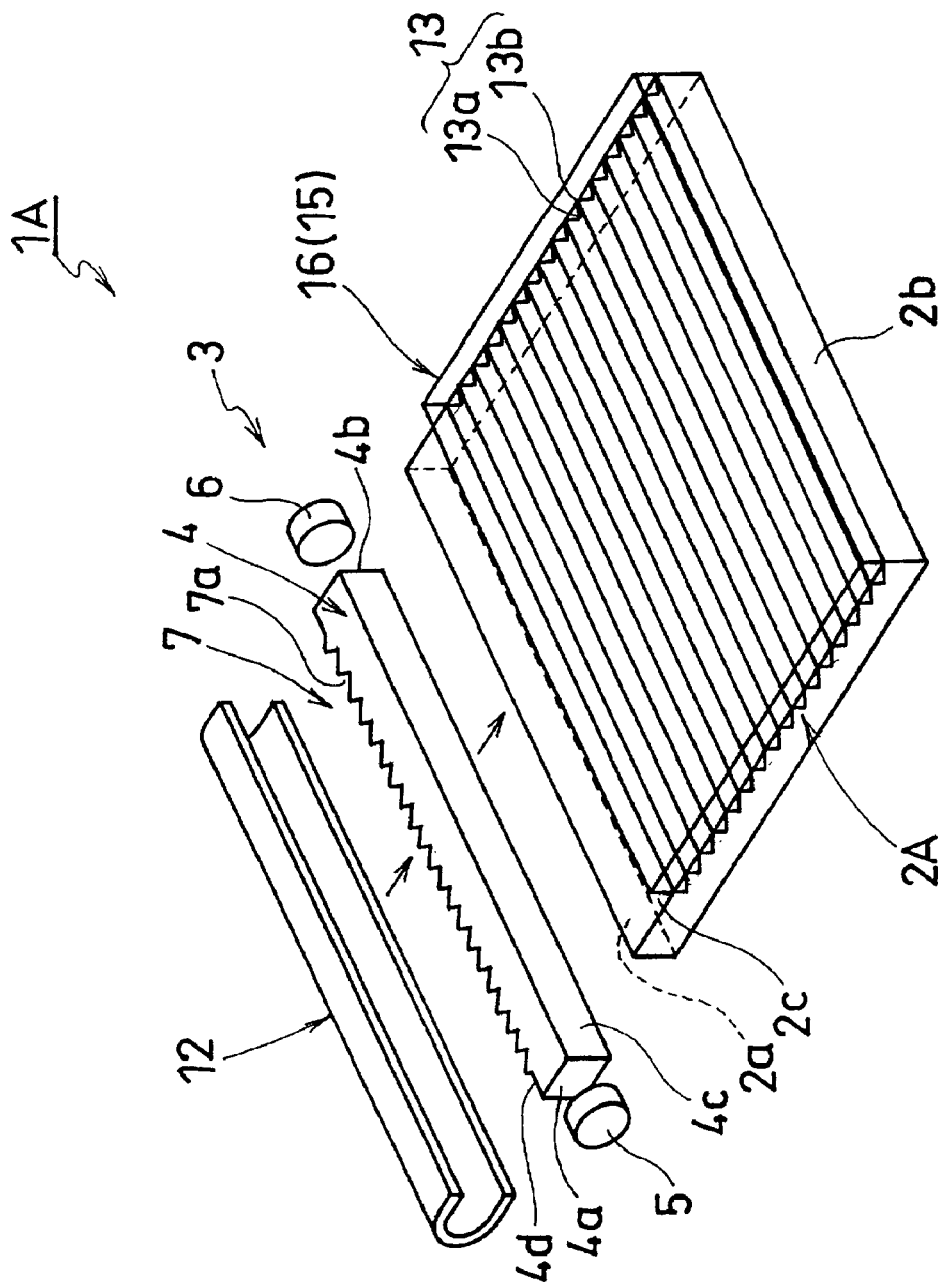
FIG. 1 is an exploded perspective view of a spread illuminating apparatus according to a first embodiment of the present invention.
Figure 2:
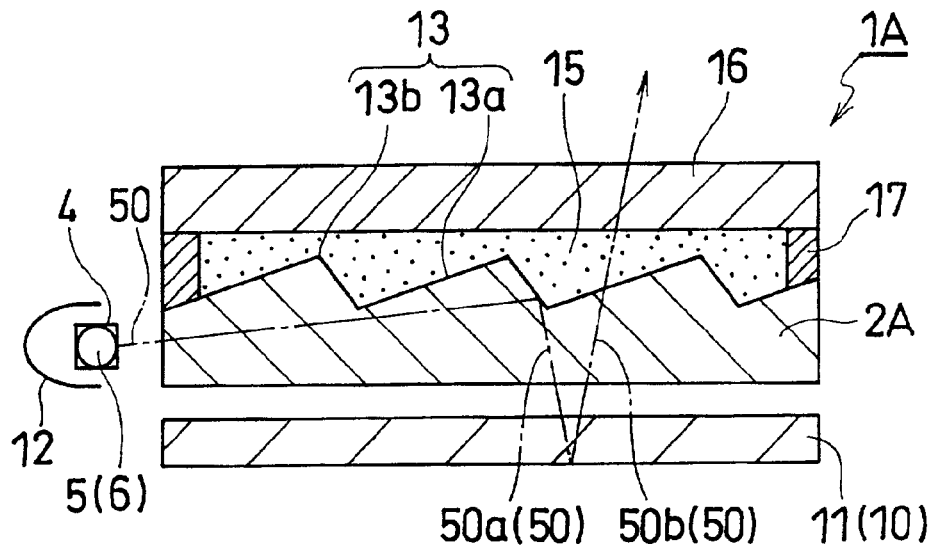
FIG. 2 is a schematic sectional view of the spread illuminating apparatus in FIG. 1.

As shown in FIGS. 1 and 2, this spread illuminating apparatus 1A is generally composed of a transparent substrate 2A made of a light-transmissible material, and a bar-like light source 3 disposed close to an end surface 2a of the transparent substrate 2A. A liquid crystal display device 10 is disposed under the transparent substrate 2A. This spread illuminating apparatus 1A irradiates a light ray 50a onto a display face 11 of the liquid crystal display device 10 from a front side (an upper side in FIG. 2) and guides a light ray 50b reflected at the display face 11 toward the front side (the upper side in FIG. 2), thereby performing front lighting function to allow a viewer to observe an image information of the display face 11.

The light source 3 is generally composed of a bar-like light conductive member 4 made of a transparent material and disposed close to and along the end surface 2a of the transparent substrate 2A, and spot-like light sources 5 and 6 disposed facing ends 4a and 4b of the light conductive member 4, respectively.

An optical path conversion means 7 is provided on a surface 4d of the light conductive member 4 opposite to a surface 4c facing the transparent substrate 2A so as to uniformly radiate light rays emitted from the spot-like light sources 5 and 6 through the surface 4c of the light conductive member 4. A frame 12 is disposed so as to cover the light conductive member 4. The frame 12 is formed by bending a metal sheet in a substantially U-shape, and has a metal (such as silver) vapor-deposited film (not shown) stuck on its inner surface so as to efficiently reflect back light rays leaking from the light conductive member 4.

A light reflection pattern 13 comprising a large number of grooves 13a shaped triangular in section is formed on an upper surface 2c (an upper side in FIG. 1) of the transparent substrate 2A. The grooves 13a are formed to extend parallel to the light conductive member 4, and are arrayed from the end surface 2a to the other end surface 2b opposite to the end surface 2a. In FIGS. 1 and 2, reference numeral 13b denotes a ridge (projection portion) formed between adjacent grooves 13a.

In the spread illuminating apparatus 1A, a fluid 15 (cushioning material) is provided on the light reflection pattern 13 of the transparent substrate 2A, and a cover 16 formed of a transparent glass (light-transmissible material) is disposed over the upper surface 2c of the transparent substrate 2A sandwiching the fluid 15.

This fluid 15 can be applied by a printing method on the cover 16 formed of a transparent glass.

The cover 16 is combined integrally with the transparent substrate 2A by a binding member 17 made of a pressure sensitive adhesive double coated tape or a resin material and interposed between respective peripheries of the cover 16 and the transparent substrate 2A, and covers the light reflection pattern 13.

The fluid 15 is of a transparent gel or liquid substance with low refractive index and interposed integrally between the transparent substrate 2A and the cover 16 to inhibit the cover 16 from touching the ridge 13b of the transparent substrate 2A. The refractive index n2 of the fluid 15 is set to be smaller than the refractive index n1 of the transparent substrate 2A (n1>n2).

Further, as described above, the binding member 17 is interposed between the respective peripheries of the cover 16 and the transparent substrate 2A, and adapted to cover the periphery of the light reflection pattern 13.

The cover 16 is combined integrally with the transparent substrate 2A together with the cushioning material before other members to constitute the spread illuminating apparatus 1A are assembled.

By providing the light reflection pattern 13, a light ray 50 coming from the light conductive member 4 is reflected almost uniformly everywhere at the transparent substrate 2A irrespective of the distance from the light conductive member 4 and irradiates the display face 11 of the liquid crystal display device 10 disposed under the transparent substrate 2A. The light ray 50 (50a) having reached the display face 11 of the liquid crystal display device 10 is reflected at the display face 11 turning into a reflected light ray 50b, passes through the transparent substrate 2A, the fluid 15 as the cushioning material, and the cover 16, and exits out (in upward direction in FIG. 2) to allow a viewer to visually recognize an image on the display face 11. Here, the refractive index n2 of the fluid 15 is set to be smaller than the refractive index n1 of the transparent substrate 2A (n1>n2), and the light ray 50 from the light conductive member 4 is reflected by the light reflection pattern 13 toward the liquid crystal display device 10 to irradiate its display face 11.

In the above-described embodiment, the cover 16 covers the light reflection pattern 13 to prevent dust generated in assembly process or during use from getting on the transparent substrate 2A. The binding member 17 covers the periphery of the light reflection pattern 13 for a dust-proof function, thereby surely preventing the refuse from entering a space between the transparent substrate 2A and the cover 16 to make the light reflection pattern 13 dust-free, which maintains excellent light conductivity.

Since the cover 16 is provided to cover the light reflection pattern 13 of the transparent substrate 2A, the light reflection pattern 13 is prevented from touching other constituent members or an assembly machine during assembly process and is protected against damages, whereby excellent light conductivity can be maintained. The fluid 15 (cushioning material) of a gel or liquid substance is interposed between the transparent substrate 2A and the cover 16, so when the other constituent members accidentally hit and bend the cover 16, the fluid 15 absorbs the bending, and the light reflection pattern 13 is protected against damages, whereby excellent light conductivity can be maintained.

In the conventional technology illustrated in FIG. 6, a film is brought into direct contact with a light reflection pattern 8 formed on a transparent substrate 2, and flat portions 8b of the light reflection pattern 8 may be damaged by this direct contact degrading the light conductivity. In this embodiment of the present invention, the problem associated with the conventional technology can be avoided, and excellent light conductivity can be maintained.

The cover 16 is formed of glass, and higher in rigidity than a film, and thus, even when the other members hit the cover 16, the cover 16 does not bend so much as a cover formed of film, and can be kept from touching the light reflection pattern 13, and therefore the light reflection pattern 13 is protected against damages. Since the cover 16 is formed of glass, the durability thereof can be better than that of the cover formed of film.

Further, in this embodiment, the cover 16 formed of a light-transmissible material is integrally provided over the upper surface 2c of the transparent substrate 2A sandwiching the fluid 15 (cushioning material) formed of a light-transmissible substance. Therefore, the spread illuminating apparatus can be downsized with regard to the height dimension.

Figure 3:
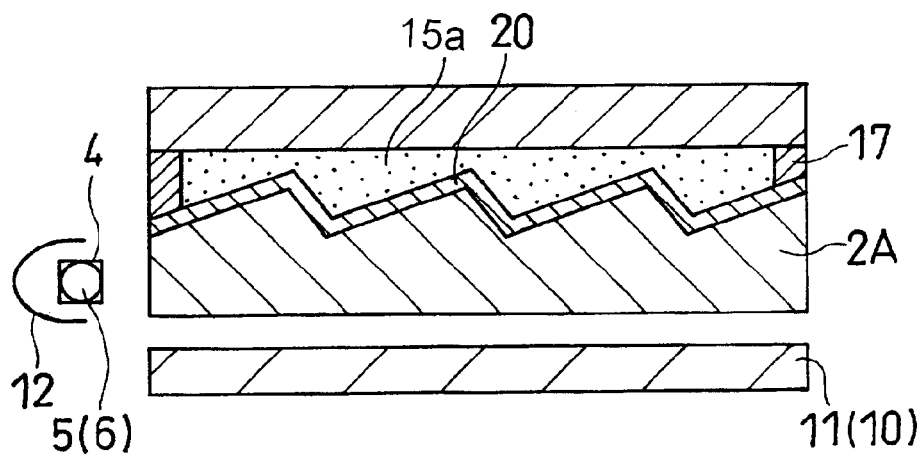
FIG. 3 is a schematic sectional view of a spread illuminating apparatus according to a second embodiment of the present invention.

In the above-described first embodiment, the transparent gel or liquid substance of the fluid 15 is required to have low refractive index. In FIG. 3, a thin film 20 of a substance having low refractive index is formed on a transparent substrate 2A, and a fluid 15a of a transparent gel or liquid substance is used as a cushioning material (second embodiment). The refractive index n3 of the thin film 20 is set to be smaller than the refractive index n1 of the transparent substrate 2A (n1>n3), and the transparent gel or liquid substance of the fluid 15a is not required to have low refractive index.

In this second embodiment, similar to the first embodiment, the cover 16 and the binding member 17 can perform a dust-proof function thereby protecting the light reflection pattern 13 against damages, and maintaining excellent light conductivity.

In addition, since the refractive index n3 of the thin film 20 is smaller than the refractive index n1 of the transparent substrate 2A (n1>n3), the light ray 50 from the light conductive member 4 can be surely reflected by the light reflection pattern 13 toward and onto the display face 11 of the liquid crystal display device 10.

In the above-described first embodiment, the fluid 15 (cushioning material) is required to have low refractive index to surely reflect the light ray from the light conductive member 4 toward and onto the display face 11 of the liquid crystal display device 10. However, in this second embodiment, since the refractive index n3 of the thin film 20 is smaller than the refractive index n1 of the transparent substrate 2A (n1>n3) thereby surely reflecting the light ray from the light conductive member 4 toward and onto the display face 11, the transparent gel or liquid substance of the fluid 15a need not have low refractive index as mentioned above, whereby increased latitude can be allowed in selecting the cushioning material.

Figure 4:
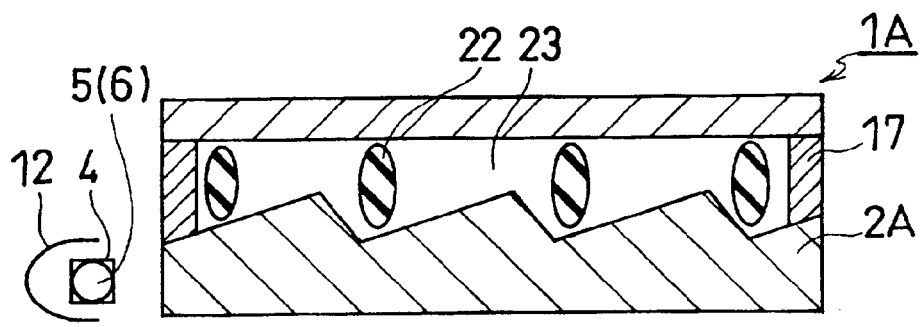
FIG. 4 is a schematic sectional view of a spread illuminating apparatus according to a third embodiment of the present invention.

The cushioning material may comprise a plurality of transparent elastic members 22 formed of a silicone synthetic resin or the like and shaped spherical, columnar or substantially rugby ball-like as illustrated in FIG. 4 (third embodiment) in place of the above-described first and second embodiments. In this embodiment, since the light ray can easily pass through a gaseous layer 23 formed between the cover 16 and the transparent substrate 2A and through the transparent elastic members 22, a front lighting function can be ensured.

In this third embodiment, similar to the first embodiment, the cover 16 and the binding member 17 can perform a dust-proof function and protect the light reflection pattern 13 against damages, thereby maintaining excellent light conductivity.

The transparent elastic members 22 are firm enough to stably support the cover 16 and inhibit it from touching the light reflection pattern 13 even when the cover 16 should bend.

Figure 5:
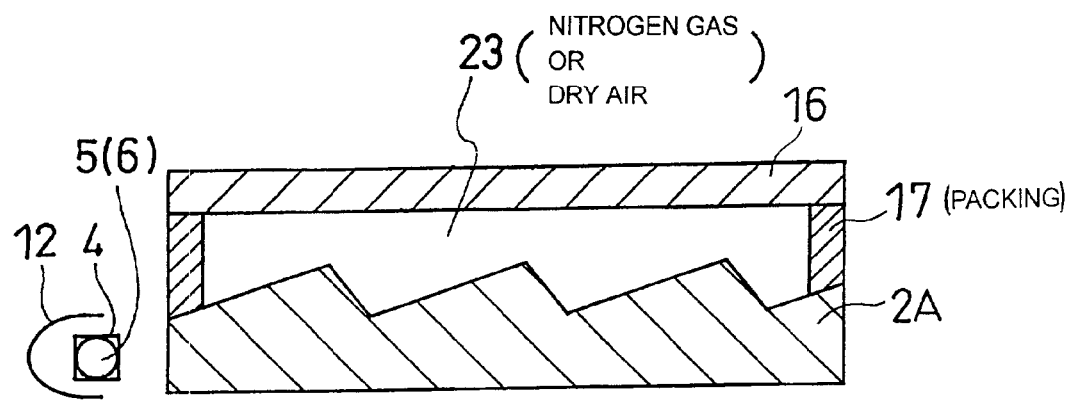
FIG. 5 is a schematic sectional view of a spread illuminating apparatus according to a fourth embodiment of the present invention.

Further, as illustrated in FIG. 5, the transparent elastic members 22 used in the above-described third embodiment (FIG. 4) may be removed leaving only a gaseous layer 23 of nitrogen gas, dry air or the like between a cover 16 and a transparent substrate 2A (fourth embodiment).

In the fourth embodiment, similar to the first embodiment, the cover 16 and a binding member 17 (packing or the like) can perform a sealing function and protect a light reflection pattern 13 against damages, thereby maintaining excellent light conductivity.

Further, even when the cover 16 bends at its center portion, the gaseous layer 23 surely supports the cover 16 and inhibits it from touching the light reflection pattern 13.

In each embodiment described above, the cover 16 is formed of glass. However, the cover may be formed of a resin film, such as acrylic resin, polyethylene terephthalate (PET), polycarbonate, vinyl chloride, or olefins, or a glass film.

In addition, nitrogen gas or dry air may be used as the cushioning material with the peripheries of the cover and the transparent substrate being airtightly sealed with a packing or the like. Further, when the spread illuminating apparatus is used in combination with a touch panel, the cover 16 may constitute a lower electrode of the touch panel to be provided over the spread illuminating apparatus.

In accordance with any one of first to thirteenth aspects of the present invention, a cover formed of a light-transmissible material is integrally provided over one surface of a transparent substrate sandwiching a cushioning material formed of a light-transmissible substance so as to cover the surface thereby preventing dust generated in assembly process or during use from getting on the transparent substrate. The cushioning material is interposed between the transparent substrate and the cover, and even when other members or an assembly machine hit the cover during assembly process and the cover bends, the bending is absorbed by the cushioning material, and the transparent substrate is protected against damages, whereby excellent light conductivity can be maintained. Further, since the cover formed of a light-transmissible material is integrally provided over the transparent substrate sandwiching the cushioning material, the spread illuminating apparatus can be downsized with regard to the height dimension.

What is claimed is:

1. A spread illuminating apparatus, comprising:
   a transparent substrate made of a light-transmissible material and having a light reflection pattern having a number of ridges formed on at least one surface thereof; and
   a bar-like light source disposed close to an end surface of the transparent substrate,
   wherein a cover formed of a light-transmissible material is integrally provided over the one surface of the transparent substrate sandwiching a cushioning material comprising a light-transmissible substance in such a manner that the number of ridges are directly covered with the cushioning material, the cushioning material is of a substance with low refractive index, and the substance is gel.

2. A spread illuminating apparatus, comprising:
   a transparent substrate made of a light-transmissible material and having a light reflection pattern having a number of ridges formed on at least one surface thereof; and
   a bar-like light source disposed close to an end surface of the transparent substrate,
   wherein a cover formed of a light-transmissible material is integrally provided over the one surface of the transparent substrate sandwiching a cushioning material comprising a light-transmissible substance in such a manner that the number of ridges are directly covered with the cushioning material, the cushioning material is of a substance with low refractive index and the substance is liquid.

3. A spread illuminating apparatus, comprising:
   a transparent substrate made of a light-transmissible material and having a light reflection pattern having a number of ridges formed on at least one surface thereof; and
   a bar-like light source disposed close to an end surface of the transparent substrate,
   wherein a cover formed of a light-transmissible material is integrally provided over the one surface of the transparent substrate sandwiching a cushioning material comprising a light-transmissible substance in such a manner that the number of ridges are directly covered with the cushioning material and the cushioning material is of a gaseous substance.

4. A spread illuminating apparatus, comprising:
   a transparent substrate made of a light-transmissible material and having a light reflection pattern having a number of ridges formed on at least one surface thereof; and
   a bar-like light source disposed close to an end surface of the transparent substrate,
   wherein a cover formed of a light-transmissible material is integrally provided over the one surface of the transparent substrate sandwiching a cushioning material comprising a light-transmissible substance in such a manner that the number of ridges are directly covered with the cushioning material, a thin film of a substance with low refractive index is formed on the light reflection pattern of the transparent substrate, and the cushioning material is of a gel substance.

5. A spread illuminating apparatus, comprising:
   a transparent substrate made of a light-transmissible material and having a light reflection pattern having a number of ridges formed on at least one surface thereof; and
   a bar-like light source disposed close to an end surface of the transparent substrate,
   wherein a cover formed of a light-transmissible material is integrally provided over the one surface of the transparent substrate sandwiching a cushioning material comprising a light-transmissible substance in such a manner that the number of ridges are directly covered with the cushioning material, a thin film of a substance with low refractive index is formed on the light reflection pattern of the transparent substrate, and the cushioning material is of a liquid substance.

6. A spread illuminating apparatus, comprising:
   a transparent substrate made of a light-transmissible material and having a light reflection pattern having a number of ridges formed on at least one surface thereof; and
   a bar-like light source disposed close to an end surface of the transparent substrate,
   wherein a cover formed of a light-transmissible material is integrally provided over the one surface of the transparent substrate sandwiching a cushioning material comprising a light-transmissible substance in such a manner that the number of ridges are directly covered with the cushioning material, a thin film of a substance with low refractive index is formed on the light reflection pattern of the transparent substrate, and the cushioning material is of a gaseous substance.

7. A spread illuminating apparatus, comprising:
   a transparent substrate made of a light-transmissible material and having a light reflection pattern having a number of ridges formed on at least one surface thereof; and
   a bar-like light source disposed close to an end surface of the transparent substrate,
   wherein a cover formed of a light-transmissible material is integrally provided over the one surface of the transparent substrate sandwiching a cushioning material comprising a light-transmissible substance in such a manner that the number of ridges are directly covered with the cushioning material, and the cushioning material comprises a plurality of transparent elastic members.

* * * * *